US008850096B2

(12) United States Patent
Zhang et al.

(10) Patent No.: US 8,850,096 B2
(45) Date of Patent: Sep. 30, 2014

(54) METHOD FOR USING WIRELESS DATA CARD INDIVIDUALLY TO ACCESS NETWORK AND WIRELESS ACCESS TERMINAL

(75) Inventors: Ruijuan Zhang, Shenzhen (CN); Hongyu Chen, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 255 days.

(21) Appl. No.: 13/509,675

(22) PCT Filed: Jun. 22, 2010

(86) PCT No.: PCT/CN2010/074262
§ 371 (c)(1),
(2), (4) Date: May 14, 2012

(87) PCT Pub. No.: WO2010/149031
PCT Pub. Date: Dec. 29, 2010

(65) Prior Publication Data
US 2012/0317325 A1  Dec. 13, 2012

(30) Foreign Application Priority Data
Dec. 3, 2009  (CN) .......................... 2009 1 0225574

(51) Int. Cl.
*H05K 7/10* (2006.01)
*G06F 1/00* (2006.01)
*G06F 13/40* (2006.01)
*G06F 1/30* (2006.01)
*H04M 1/725* (2006.01)
*G06F 1/16* (2006.01)
*G06F 1/26* (2006.01)

(52) U.S. Cl.
CPC ......... *H04M 1/72527* (2013.01); *G06F 13/409* (2013.01); *G06F 1/30* (2013.01); *G06F 1/1632* (2013.01); *H04M 2250/14* (2013.01); *G06F 1/263* (2013.01); *G06F 1/266* (2013.01); *G06F 13/4022* (2013.01)
USPC .......................... 710/301; 710/316; 713/340

(58) Field of Classification Search
CPC ....... G06F 13/4081; G06F 13/28; G06F 1/26; G06F 1/30
USPC .......................... 710/301–317; 713/300–340
See application file for complete search history.

(56) References Cited

U.S. PATENT DOCUMENTS 6,671,814 B1 * 12/2003 Kubo et al. .................... 713/324
7,978,774 B2 * 7/2011 Feher ............................ 375/260
(Continued)

FOREIGN PATENT DOCUMENTS

CN    101420757 A    4/2009
CN    101430645 A    5/2009
(Continued)

OTHER PUBLICATIONS

International Search Report for PCT/CN2010/074262, English Translation attached to original, Both Completed by the Chinese Patent Office on Jul. 14, 2010, All together 6 Pages.

*Primary Examiner* — Raymond Phan
(74) *Attorney, Agent, or Firm* — Brooks Kushman P.C.

(57) ABSTRACT

A method is provided for using a wireless data card individually to access a network, and a wireless access terminal is provided. The wireless access terminal includes a data line switching module and a power line switching module. The method includes, when the wireless access terminal detects that the wireless data card is connected with a terminal through a universal serial bus (USB) cable, the power line and the data line of the wireless data card are respectively switched to connect the data line and the power line of the external USB interface thereon. A user can still freely connect the 3G network at anytime and anywhere by connecting a common USB cable between the laptop and the wireless data card in the wireless access terminal in the case without the mains supply.

18 Claims, 2 Drawing Sheets

(56) References Cited

U.S. PATENT DOCUMENTS

| | | | |
|---|---|---|---|
| 2008/0077722 A1* | 3/2008 | Tang et al. | 710/260 |
| 2009/0119659 A1 | 5/2009 | Zou et al. | |
| 2009/0172208 A1* | 7/2009 | Lee et al. | 710/13 |
| 2009/0172759 A1* | 7/2009 | Jung | 725/111 |
| 2010/0161865 A1* | 6/2010 | Xie et al. | 710/300 |
| 2011/0151858 A1* | 6/2011 | Lai | 455/422.1 |
| 2012/0144213 A1* | 6/2012 | Chang et al. | 713/300 |
| 2012/0231835 A1* | 9/2012 | Zhang et al. | 455/552.1 |

FOREIGN PATENT DOCUMENTS

| | | |
|---|---|---|
| CN | 201238318 Y | 5/2009 |
| CN | 101741573 A | 6/2010 |
| WO | 2009111904 A1 | 9/2009 |

\* cited by examiner ically adopts the dual embedded microprocessor, and can support the Ethernet 10/100M interface connected with the PC machine, support the wireless fidelity access point (WIFI AP) function, support the basic conversation function of the RJ11 telephone interface, and support the 3G wireless data card using the universal serial bus (USB) port. The user can realize the HSDPA surfing the net at a high speed by the connection through the Ethernet interface or the WLAN, or realize the basic conversation service through the RJ11 telephone interface. In order to meet the portable requirement, the wireless data card generally uses the USB universal port, but the power consumption of a plurality of the wireless access terminals with built-in wireless data card using the USB port is relatively great at present, and these wireless access terminals are only applicable in the case with the mains supply, so the wireless access terminal generally will be provided with the external power supply, and are powered by the external power supply to realize the above-mentioned function in the case with the mains supply.

METHOD FOR USING WIRELESS DATA CARD INDIVIDUALLY TO ACCESS NETWORK AND WIRELESS ACCESS TERMINAL

CROSS-REFERENCE TO RELATED APPLICATION

This application is the U.S. national phase of PCT Appln. No. PCT/CN2010/074262 filed Jun. 22, 2010 which claims priority to Chinese Application No. 200910225574.8 filed Dec. 3, 2009, the disclosures of which are incorporated in their entirety by reference herein.

TECHNICAL FIELD

The present invention relates to the field of wireless access technology of the 3rd generation mobile communication, and in particular, to a method and wireless access terminal for using a wireless data card individually to access a network.

BACKGROUND OF THE RELATED ART

With the development and popularizing of the 3rd-generation (3G) mobile communication technology in the world, especially the acceleration of the commercialization process of the wideband code division multiple access (WCDMA)/high speed downlink packet access (HSDPA) network and swift and the violent development of the 3G service, the operator can provide kinds of high-quality multimedia service, thus bring the diversified requirement of the terminal, including wireless data card, mobile phone, wireless access terminal, etc. Wherein the wireless access terminal can realize providing the wireless local area network (WLAN) coverage when adapting to the 3G wireless data card, that is, it can realize that the small size portable terminal performs the wireless communication at anytime and anywhere, and this service is directed primarily to the high-end commercial user, enterprises and institutions users and ordinary family user.

The wireless access terminal device generally adopts the dual embedded microprocessor, and can support the Ethernet 10/100M interface connected with the PC machine, support the wireless fidelity access point (WIFI AP) function, support the basic conversation function of the RJ11 telephone interface, and support the 3G wireless data card using the universal serial bus (USB) port. The user can realize the HSDPA surfing the net at a high speed by the connection through the Ethernet interface or the WLAN, or realize the basic conversation service through the RJ11 telephone interface. In order to meet the portable requirement, the wireless data card generally uses the USB universal port, but the power consumption of a plurality of the wireless access terminals with built-in wireless data card using the USB port is relatively great at present, and these wireless access terminals are only applicable in the case with the mains supply, so the wireless access terminal generally will be provided with the external power supply, and are powered by the external power supply to realize the above-mentioned function in the case with the mains supply.

To the commercial user, its requirement for the mass data service and the mobile working is increased day by day, and especially the requirement for the mobile portability is increased day by day. It is not merely required to be able to easily realize the wireless local area network function through the wireless access terminal in the office locations such as the meeting room, office building, etc., but is also required to be able to easily realize the net surfing function through the wireless data card in temporary places such as the airport, hotel, etc. However, in the case without the mains power in the temporary place, the current wireless access terminal is unable to meet the user required 3G net surfing function, which makes the wireless access terminal lose the advantage of the portability and the convenience in the case without the mains power.

SUMMARY OF THE INVENTION

The technical problem that the present invention requires to solve is to provide a method and wireless access terminal for using a wireless data card individually to access a network, to solve the defects that the current wireless access terminal cannot meet the user required 3G net surfing function in the case of without the mains supply.

To solve the above-mentioned technical problem, the present invention provides a method for using a wireless data card individually to access a network, comprising:

when a wireless access terminal detects that the wireless data card is connected with a terminal through a universal serial bus (USB) cable, switching a power line and a data line of the wireless data card to connect the power line and the data line of the wireless data card respectively to a data line and a power line of an external USB interface on the wireless data card.

The above-mentioned method further can have the following characteristics:

the wireless access terminal is configured with a data line switching module; the data line switching module is configured with three ports and one switch to enable switching; wherein, a first port connects a data line of a central processing unit (CPU) within the wireless access terminal; a second port connects the data line of the wireless data card, a third port connects the data line of the external USB interface, and the switch to enable switching connects the power line of the external USB interface;

the method further comprises: when there is no electricity in the power line of the external USB interface, the switch to enable switching conducting the first port and the second port; and the step of the wireless access terminal switching the data line of the wireless data card to connect the data line of the wireless data card to the data line of the external USB interface on the wireless data card comprises: the switch to enable switching, when there is electricity in the power line of the external USB interface, disconnecting connection between the first port and the second port, and conducting the second port and the third port.

The above-mentioned method further can have the following characteristics:

the wireless access terminal is configured with a power line switching module; the power line switching module is configured with three interfaces, one power control unit and one single-pole double throw switch; wherein, a first interface connects the power interface of the wireless access terminal; a second interface connects the power line of the external USB interface, a third interface connects the power line of the wireless data card, and a first connection end of the single-pole double throw switch connects the third interface;

the method further comprises: when it is not detected that the wireless data card establishes connection with the terminal through the USB cable, the power control unit controlling a second connection end of the single-pole double throw switch to connect the first interface; and the step of the wireless access terminal switching the power line of the wireless data card to connect the power line of the wireless data card to the power line of the external USB interface on the wireless data card comprises: when it is detected that the wireless data card establishes connection with the terminal through the USB cable, the power control unit controlling the second connection end of the single-pole double throw switch to connect the second interface.

The above-mentioned method further can comprise:

when the wireless access terminal detects that the internal wireless data card establishes connection with the terminal through the USB cable, disconnecting input of device secondary power of the wireless access terminal.

The above-mentioned method further can have the following characteristics:

the wireless access terminal is configured with a data line switching module; the data line switching module is configured with three ports and one switch to enable switching; wherein, a first port connects the data line of the central processing unit (CPU) within the wireless access terminal; a second port connects the data line of the wireless data card, a third port connects the data line of the external USB interface, and the switch to enable switching connects the power interface of the wireless access terminal;

the method further comprises: when there is electricity in the power interface of the wireless access terminal, the switch to enable switching conducting the first port and the second port; and the step of the wireless access terminal switching the data line of the wireless data card to connect the data line of the wireless data card to the data line of the external USB interface on the wireless data card comprises: the switch to enable switching, when there is no electricity in the power interface of the wireless access terminal, disconnecting the connection between the first port and the second port, and conducting the second port and the third port.

The above-mentioned method further can have the following characteristics:

the wireless access terminal is configured with a power line switching module; the power line switching module is configured with three interfaces, one power control unit and one single-pole double throw switch; wherein, a first interface connects the power interface of the wireless access terminal; a second interface connects the power line of the external USB interface, a third interface connects the power line of the wireless data card, and a first connection end of the single-pole double throw switch connects the third interface;

the method further comprises: when it is detected that there is electricity in the power interface of the wireless access terminal, the power control unit controlling the second connection end of the single-pole double throw switch to connect the first interface; and the step of the wireless access terminal switching the power line of the wireless data card to connect the power line of the wireless data card to the power line of the external USB interface on the wireless data card comprises: when it is detected that there is no electricity in the power interface of the wireless access terminal, the power control unit controlling the second connection end of the single-pole double throw switch to connect the second interface. The above-mentioned method further can have the following characteristics:

the data line switching module is a high-speed analog switch, and the power line of the high-speed analog switch connects the power line of the external USB interface and the power interface of the wireless access terminal.

The above-mentioned method further can have the following characteristics:

the power line switching module is a relay, the power control unit is a coil within the relay, and a power input end of that coil connects the power line of the external USB interface or the power interface of the wireless access terminal.

To solve the above-mentioned problem, the present invention further provides a wireless access terminal for using a wireless data card individually to access a network, comprising a data line switching module and a power line switching module, wherein, the data line switching module is configured to, when it is detected that the wireless data card is connected with a terminal through a universal serial bus (USB) cable, switch a data line of the wireless data card to connect the data line of the wireless data card to a data line of an external USB interface of the wireless data card; and the power line switching module is configured to, when it is detected that the wireless data card within the wireless access terminal is connected with the terminal through the USB cable, switch a power line of the wireless data card to connect the power line of the wireless data card to a power line of the external USB interface of the wireless data card.

The above-mentioned wireless access terminal further can have the following characteristics:

the data line switching module is configured with three ports and one switch to enable switching; wherein, a first port connects a data line of a central processing unit (CPU) within the wireless access terminal; a second port connects the data line of the wireless data card, and a third port connects the data line of the external USB interface; and the switch to enable switching connects the power line of the external USB interface, and is configured to: when there is no electricity in the power line of the external USB interface, conduct the first port and the second port; and when there is electricity in the power line of the external USB interface, disconnect connection between the first port and the second port and conduct the second port and the third port.

The above-mentioned wireless access terminal further can have the following characteristics:

the power line switching module is configured with three interfaces, one power control unit and one single-pole double throw switch; wherein, a first interface connects a power interface of the wireless access terminal; a second interface connects the power line of the external USB interface, the a interface connects the power line of the wireless data card, and a first connection end of the single-pole double throw switch connects the third interface;

the power control unit is configured to: when it is not detected that the wireless data card establishes the connection with the terminal through the USB cable, control a second connection end of the single-pole double throw switch to connect the first interface; and when it is detected that the wireless data card establishes the connection with the terminal through the USB cable, control the second connection end of the single-pole double throw switch to connect the second interface.

The above-mentioned wireless access terminal further can have the following characteristics:

the wireless access terminal further comprises a complete machine power control module, which is configured to, when it is detected that the wireless data card establishes the connection with the terminal through the USB cable, disconnect input of device secondary power of the wireless access terminal.

The above-mentioned wireless access terminal further can have the following characteristics:

the complete machine power control module comprises a self-powered unit and one metal-oxide-semiconductor field-effect transistor (MOSFET);

the self-powered unit is configured to provide a secondary voltage for the MOSFET;

a source of the MOSFET connects an output end of the self-powered unit and a secondary power enabling end of the wireless access terminal, a grid connects the power line of the external USB interface, and a drain is earthed.

The above-mentioned wireless access terminal further can have the following characteristics:

the self-powered unit is a low dropout linear regulator (LDO), input of the LDO is the output of an external power adapter of the wireless access terminal after plugging in mains power, and the LDO is configured to transform a primary voltage output by the power adapter into the secondary voltage and then input into the MOSFET.

The above-mentioned wireless access terminal further can have the following characteristics:

the data line switching module is configured with three ports and one switch to enable switching; wherein, the first port connects the data line of the central processing unit (CPU) within the wireless access terminal; the second port connects the data line of the wireless data card, and the third port connects the data line of the external USB interface; and the switch to enable switching connects the power interface of the wireless access terminal and is configured to: when there is electricity in the power interface of the wireless access terminal, conduct the first port and the second port; and when there is no electricity in the power interface of the wireless access terminal, disconnect the connection between the first port and the second port and conduct the second port and the third port.

The above-mentioned wireless access terminal further can have the following characteristics:

the power line switching module is configured with three interfaces, one power control unit and one single-pole double throw switch; wherein, the first interface connects the power interface of the wireless access terminal; the second interface connects the power line of the external USB interface, the third interface connects the power line of the wireless data card, and the first connection end of the single-pole double throw switch connects the third interface;

the power control unit is configured to: when it is detected that there is electricity in the power interface of the wireless access terminal, controlling the second connection end of the single-pole double throw switch to connect the first interface; and when it is detected that there is no electricity in the power interface of the wireless access terminal, controlling the second connection end of the single-pole double throw switch to connect the second interface.

The above-mentioned wireless access terminal further can have the following characteristics:

the data line switching module is a high-speed analog switch, and the power line of the high-speed analog switch connects the power line of the external USB interface and the power interface of the wireless access terminal.

The above-mentioned wireless access terminal further can have the following characteristics:

the power line switching module is a relay, the power control unit is a coil within the relay, and a power input end of that coil connects the power line of the external USB interface or the power interface of the wireless access terminal.

By adopting the present invention, the user can still freely connect the 3G network at anytime and anywhere by connecting a common USB cable between the laptop and the wireless data card in the wireless access terminal in the case without the mains supply. The portable mobility of the wireless access terminal is realized easily without the limitation of the mains supply any more.

PREFERRED EMBODIMENTS OF THE PRESENT INVENTION

The technical scheme of the present invention is described in detail with reference to the accompanying drawings and in combination with the embodiments hereinafter.

The present invention provides a method and wireless access terminal for using a wireless data card individually to access a network, in the case with the mains supply, the terminal (such as, laptop computer) connect the 3G wireless data card with the WLAN or the LAN, but in the cases without the mains supply, it connects the wireless access terminal through an ordinary USB line, which can realize switching the circuit of the USB interface of the built-in wireless data card within the wireless access terminal and makes the laptop use the wireless data card individually to realize the net surfing function. For simplicity, the USB interface which performs the USB connection with the terminal on the wireless data card is abbreviated as the external USB interface hereinafter.

The basic idea of the method of the present invention is: when the wireless access terminal detects that the wireless data card establishes a connection with a terminal through a USB cable, respectively switching a power line and a data line of the wireless data card to connect the power line and the data line of the wireless data card respectively to the data line and the power line of the external USB interface on the wireless data card.

Figure 1:
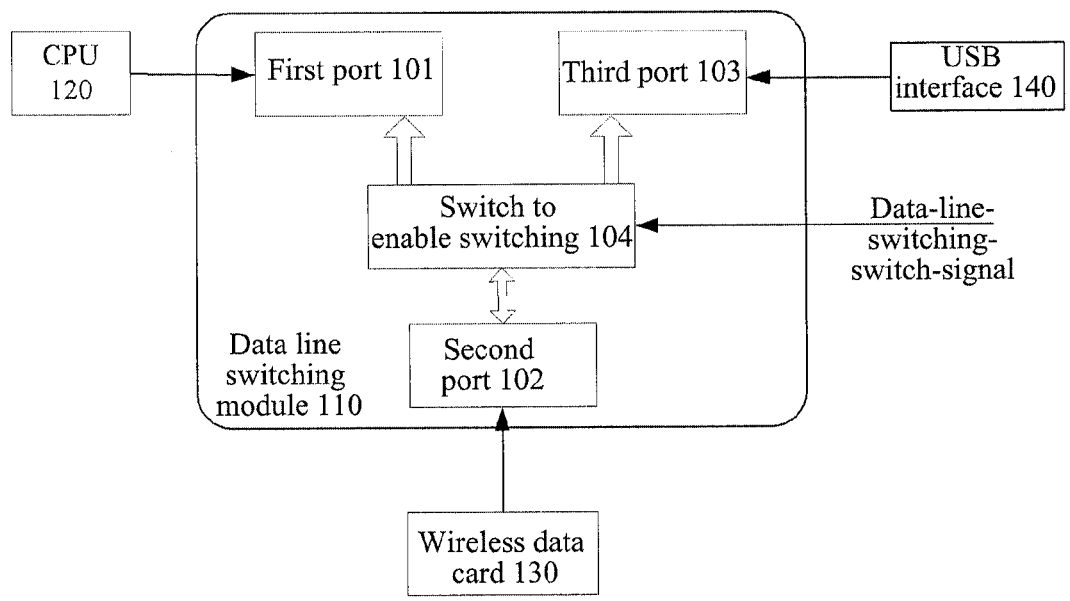
FIG. 1 is a structure diagram of a data line switching module according to an embodiment of the present invention.

In specific implementation, a data line switching module can be set in the wireless access terminal to realize switching the data line of the wireless data card to connect the data line of the wireless data card to the data line of the external USB interface thereon. As shown in FIG. 1, the data line switching module 110 is configured with three ports 101~103 and one switch to enable switching 104. Wherein, a first port 10 connects a data line of the above-mentioned CPU 120; a second port 102 connects the data line of the wireless data card 130, a third port 103 connects the data line of the external USB interface 140; and the switch to enable switching 104 is configured to conduct the first port 101 and the second port 102, or conduct the second port 102 and the third port 103 under the function of the external-data-line-switching-switch-signal. The external-data-line-switching-switch-signal can be provided by the power line of the external USB interface; when the wireless data establishes the connection with the terminal through the USB cable, the external-data-line-switching-switch-signal is of high level, and the switch to enable switching 104 can conduct the second port 102 and the third port 103 under the function of that signal, that is, the data connection between the wireless data card and the external USB interface is established; when the wireless data card disconnects the USB connection with the terminal, the external-data-line-switching-switch-signal is low level, and the switch to enable switching 104 can disconnect the connection of the second port 102 and the third port 103 under the function of that signal and conduct the second port 102 and the first port 101.

Preferably, that data line switching module can be realized by a high-speed analog switch, and the power line of the high-speed analog switch connects the power line of the external USB interface and the power interface of the wireless access terminal, that is, that high-speed analog switch is powered by the device secondary power 5V or the externally plugged USB cable 5V. In the case with the mains supply, the device secondary power 5V powers the above-mentioned high-speed analog switch; in the case without the mains supply, the USB cable of the externally plugged laptop powers the high-speed analog switch, that is to say, even in the case without the mains supply, only if the wireless access terminal establishes the connection with the terminal through the USB cable, that high-speed analog switch can work normally.

Figure 2:
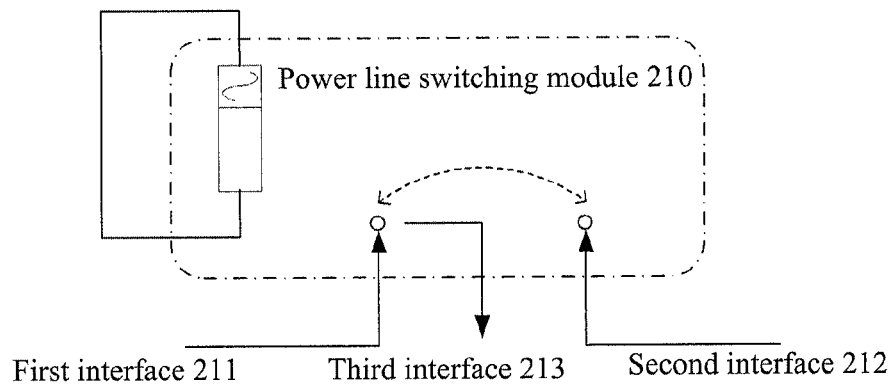
FIG. 2 is a structure diagram of a power line switching module according to an embodiment of the present invention.

In addition, the above-mentioned switching the power line of the wireless data card to connect the power line of the wireless data card to the power line of the external USB interface thereon can be realized through the following way: the wireless access terminal is configured with one power line switching module. As shown in FIG. 2, the power line switching module 210 is configured with three interfaces 211~213, one power control unit and one single-pole double throw switch. Wherein, a first interface 211 connects the power interface of the wireless access terminal; a second interface 212 connects the power line of the external USB interface, and a third interface 213 connects the power line of the wireless data card. A first connection end of the single-pole double throw switch connects the third interface 213, and a second connection end connects the first interface 211 or the second interface 212 under the control of the power control unit. When it is detected that the wireless access terminal establishes the connection with the terminal power through the USB cable, the power control unit controls the second connection end of the single-pole double throw switch to connect the second interface 212; while in other situations, the power control unit controls the second connection end of the single-pole double throw switch to connect the first interface 212.

Since the relay can make the controlled output circuit conducted or disconnected when the input quantity (such as, voltage) reaches the specified value, the function of the above-mentioned power line switching module can be realized by using the relay with three interfaces and one single-pole double throw switch. The coil within that relay is the above-mentioned power control unit, and the power input end of that coil can connect the power line of the external USB interface, that is, the external USB interface supplies power for that coil. When the wireless data card does not establish the connection with the terminal through the USB cable, there is no electricity in the external USB interface, so the coil of the relay is of low level, and it controls the second connection end of the single-pole double throw switch to connect the first interface; when the wireless data card establishes the connection with the terminal through the USB cable, the external USB interface is powered on, so the coil of the relay is of high level, and it controls the second connection end of the single-pole double throw switch to connect the second interface, that is, the power connection between the wireless data card and the terminal is established.

In addition, in the specific implementation, the data-line-switching-switch-signal driving the switch to enable switching within the data line switching module can also be provided by the device secondary power, and other characteristics are the same as the above-mentioned data line switching module, and will no longer go into details here. Under the implementation way, when the wireless access terminal connects the external power adapter, the external-data-line-switching-switch-signal is of high level, and the switch to enable switching can conduct the second port and the first port under the function of that signal; when the wireless access terminal disconnects the connection with the external power adapter, the external-data-line-switching-switch-signal is of low level, and the switch to enable switching can disconnect the connection between the second port and the first port and conduct the second port and the third port under the function of that signal, that is, the data connection between the wireless data card and the external USB interface is established. When that wireless data card establishes the connection with the terminal through the USB cable, that wireless data card can perform data communication with the terminal through the USB cable.

Similarly, in the specific implementation, the power input end of the coil in the relay can also connect the power interface of the wireless access terminal, that is, the secondary power of the device supplies power for that coil, and other characteristics of the relay are same as the above-mentioned relay and will no longer go into details here. When the wireless access terminal connects the power adapter, the power interface thereon is powered on, so the coil of the relay is of high level, and it controls the second connection end of the single-pole double throw switch to connect the first interface; when the wireless access terminal disconnects the connection with the power adapter, there is no electricity on its power interface, so the coil of the relay is of low level, and it controls the second connection end of the single-pole double throw switch to connect the second interface, that is, the power connection between the wireless data card and the terminal is established.

However, if the device secondary power is used to supply power for the coil of the relay or the data-line-switching-switch-signal, it may bring a problem, that is: when the wireless data card establishes the connection with the terminal through the USB cable, if the wireless access terminal still connects the power adapter (that is, there is still electricity in the wireless access terminal), it is unable to realize switching the data line and power line of the wireless data card to the external USB interface since the electrical level of the coil and the electrical level of the data-line-switching-switch-signal are high, and then a conflict appears. So, it needs to cut off the input of the device secondary power of the wireless access terminal when the wireless data card establishes the connection with the terminal through the USB cable.

The function can be realized by setting a complete machine power control module in the wireless access terminal. The complete machine power control module includes a self-powered unit and one N-channel metal-oxide-semiconductor field-effect transistor (MOSFET) switch.

Figure 3:
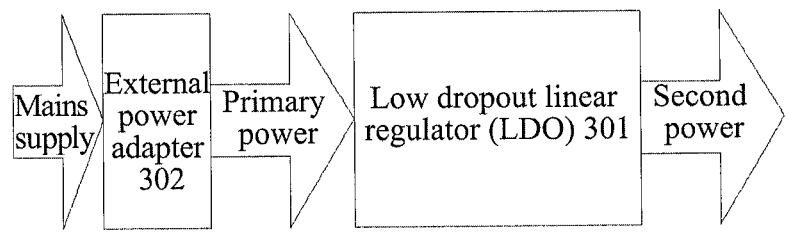
FIG. 3 is a schematic diagram of a self-powered unit according to an embodiment of the present invention.

As shown in FIG. 3, the self-powered unit is realized by a low dropout linear regulator (low dropout regulator, LDO), and its input is the output of an external power adapter 302 of the device after plugging in the mains power, and the LDO transforms the primary large voltage output by the power adapter 302 into the secondary small voltage for using by the following MOSFET switch.

Figure 4:
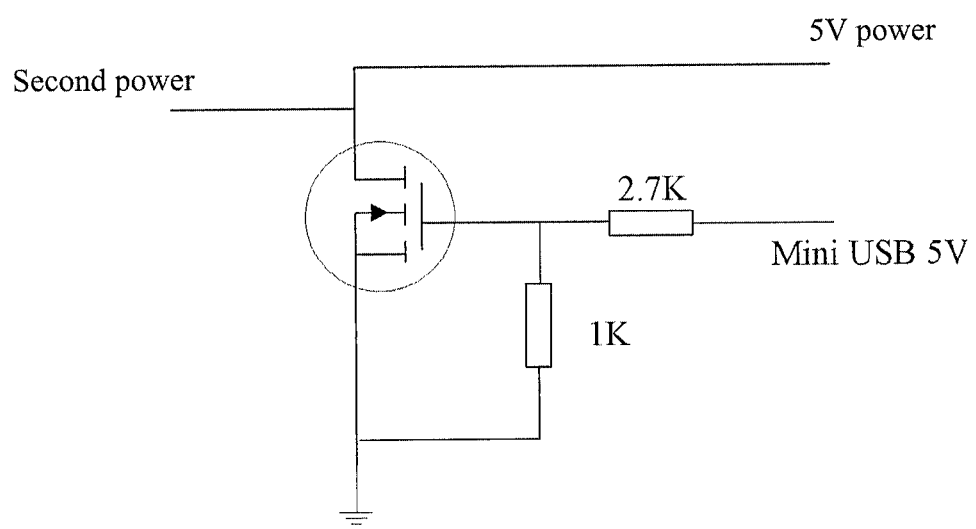
FIG. 4 is a structure diagram of complete machine power control module according to an embodiment of the present invention.

As shown in FIG. 4, a source of the MOSFET connects an output end of the self-powered unit and a secondary power enabling end of the wireless access terminal, a grid connects the power line of the external USB interface, and a drain is earthed. In the case with the mains supply, when there is no externally plugged USB cable, there is no voltage in the grid, the MOSFET is closed, thus the source turns on the secondary power enabling end of the wireless access terminal since the self-powered unit normally outputs the high level, and there is electricity in the power interface of the wireless access terminal, so the wireless access terminal is powered on; in the case without the mains supply, when the user externally plugs the USB cable between the wireless data card and the terminal, the grid voltage raises to 5V, the MOSFET conducts and draws low the source, and thus the secondary power enabling end of the wireless access terminal is closed. There is no electricity in the power interface of the wireless access terminal, so the wireless access terminal is powered down, and since the external USB interface part has the externally connected cable, the wireless data card connects the terminal normally. So, when adopting the complete machine power control module, the power of the wireless access terminal and the connection with the wireless data card can be turned off at the time when the data line and the power line of 3G wireless data card are switched to the external USB cable, which guarantees that the data line and the power line do not conflict.

Here it should be noted that the MOSFET instead of the triode is used in the complete machine power control module, which is because it is found in the single board debugging that: in the case that it is normal to supply power by the mains supply, the Power button is manually pressed down to impel the secondary power of the device to power on, and the CPU works normally after powering on, but the relay may not totally finish the on and off action in the extremely transient power on process yet, when the wireless data card connects the CPU in the wireless access terminal acquiescently, which may reverse the voltage from the data line to the wireless data card, thus reversing into the pin of the external USB power. The pin connects the base electrode of the triode, which is a current-driven type device and a little voltage can form the drive current to conduct the triode, then the secondary power enabling end of the device is drawn low and the wireless access terminal is then powered down and thus the wireless access terminal can not start normally. And the MOSFET is a voltage-driven type device, and the break-over voltage can be accurately controlled when the appropriate resistance-value resistance is configured outside the MOSFET pin. Even if the grid externally connects the abnormal voltage in series, so long as the magnitude of voltage after dividing voltage does not reach the cut-in voltage of the MOSFET, the MOSFET is closed, which can steadily guarantee the secondary power of the device are turned on, and thus guarantee that the wireless access terminal works normally.

Accordingly, the wireless access terminal described by the present invention includes a data line switching module and a power line switching module, wherein, the data line switching module is configured to, when it is detected that the wireless data card is connected with a terminal through a USB cable, switch a data line of the wireless data card to connect the data line of the wireless data card to a data line of an external USB interface of the wireless data card;

the power line switching module is configured to, when it is detected that the wireless data card within the wireless access terminal is connected with the terminal through the USB cable, switch a power line of the wireless data card to connect the power line of the wireless data card to a power line of the external USB interface of the wireless data card.

Preferably, the data line switching module is configured with three ports and one switch to enable switching; wherein, a first port connects a data line of a CPU within the wireless access terminal; a second port connects the data line of the wireless data card, and a third port connects the data line of the external USB interface; and the switch to enable switching connects the power line of the external USB interface, and is configured to: when there is no electricity in the power line of the external USB interface, conduct the first port and the second port; and when there is electricity in the power line of the external USB interface, disconnect the connection between the first port and the second port and conduct the second port and the third port.

The power line switching module is configured with three interfaces, one power control unit and one single-pole double throw switch; wherein, a first interface connects a power interface of the wireless access terminal; a second interface connects the power line of the external USB interface, the a interface connects the power line of the wireless data card, and a first connection end of the single-pole double throw switch connects the third interface; and the power control unit is configured to: when it is not detected that the wireless data card establishes the connection with the terminal through the USB cable, control a second connection end of the single-pole double throw switch to connect the first interface; and when it is detected that the wireless data card establishes the connection with the terminal through the USB cable, control the second connection end of the single-pole double throw switch to connect the second interface.

In addition, the wireless access terminal further can include a complete machine power control module, configured to, when it is detected that the wireless data card establishes the connection with the terminal through the USB cable, disconnect input of device secondary power of the wireless access terminal.

According to the above-mentioned description, the complete machine power control module includes a self-powered unit and one metal-oxide-semiconductor field-effect transistor (MOSFET);

the self-powered unit is configured to provide the secondary voltage for the MOSFET; in the specific implementation, the self-powered unit can be a LDO, input of the LDO is the output of an external power adapter of the wireless access terminal after plugging in mains power, and the LDO is configured to transform a primary voltage output by the power adapter into a secondary voltage and then input into the MOSFET.

A source of the MOSFET connects an output end of the self-powered unit and a secondary power enabling end of the wireless access terminal, a grid connects the power line of the external USB interface, and a drain is earthed.

Under the precondition that the wireless access terminal contains the complete machine power control module, another implementation way of the data line switching module is that: the module is configured with three ports and one switch to enable switching; wherein, the first port connects the data line of the CPU; the second port connects the data line of the wireless data card, and the third port connects the data line of the external USB interface; and the switch to enable switching connects the power interface of the wireless access terminal and is configured to: when there is electricity in the power interface of the wireless access terminal, conduct the first port and the second port; and when there is no electricity in the power interface of the wireless access terminal, disconnect the connection between the first port and the second port and conduct the second port and the third port.

Similarly, another implementation way of the power line switching module is that: the module is configured with three interfaces, one power control unit and one single-pole double throw switch; wherein, the first interface connects the power interface of the wireless access terminal; the second interface connects the power line of the external USB interface, the third interface connects the power line of the wireless data card, and the first connection end of the single-pole double throw switch connects the third interface;

the power control unit is configured to: when it is detected that there is electricity in the power interface of the wireless access terminal, controlling the second connection end of the single-pole double throw switch to connect the first interface; and when it is detected that there is no electricity in the power interface of the wireless access terminal, controlling the second connection end of the single-pole double throw switch to connect the second interface.

In the specific implementation, the data line switching modules of the two above-mentioned implementation ways can be realized through a high-speed analog switch, and the power line of the high-speed analog switch connects the power line of the external USB interface and the power interface of the wireless access terminal.

In the specific implementation, the power line switching modules of the two above-mentioned implementation ways can be realized through one relay, the power control unit is a coil within the relay, and a power input end of that coil connects the power line of the external USB interface or the power interface of the wireless access terminal.

In sum, in the case without the mains supply, when the wireless access terminal is unable to work because there is no electricity in the external power adapter, it can realize the net surfing through the USB port switching, that is, by connecting the USB port of the terminal with the USB interface of the wireless access terminal through an common USB cable, the data line switching module of USB port will automatically switch the data line and the power line of the built-in 3G wireless data card to the external USB cable, and the terminal supplies power for the wireless data card and drives the built-in 3G wireless data card to surf the net, thus working and amusing conveniently and easily.

Obviously, the present invention can have a variety of other embodiments. Those skilled in the art can make the corresponding modifications and variations according to technical scheme and the conception of the present invention without departing from the spirit and essence of the present invention. And all of these modifications or the variations should be embodied in the scope of the appending claims of the present invention.

INDUSTRIAL APPLICABILITY

By adopting the technical scheme of the present invention, the user can still freely connect the 3G network at anytime and anywhere by connecting a common USB cable between the laptop and the wireless data card within the wireless access terminal in the case without the mains supply. The portable mobility of the wireless access terminal is realized easily without the limitation of the mains supply any more.

What we claim is:

1. A method for using a wireless data card individually to access a network, comprising:
   when a wireless access terminal detects that the wireless data card is connected with a terminal through a universal serial bus (USB) cable, switching a power line and a data line of the wireless data card to connect the power line and the data line of the wireless data card respectively to a data line and a power line of an external USB interface on the wireless data card; wherein,
   the wireless access terminal is configured with a data line switching module; the data line switching module is configured with three ports and one switch to enable switching; wherein, a first port connects a data line of a central processing unit (CPU) within the wireless access terminal; a second port connects the data line of the wireless data card, a third port connects the data line of the external USB interface, and the switch to enable switching connects the power line of the external USB interface; the method further comprises: when there is no electricity in the power line of the external USB interface, the switch to enable switching conducting the first port and the second port; and the step of the wireless access terminal switching the data line of the wireless data card to connect the data line of the wireless data card to the data line of the external USB interface on the wireless data card comprises: the switch to enable switching, when there is electricity in the power line of the external USB interface, disconnecting connection between the first port and the second port, and conducting the second port and the third port;
   or, the wireless access terminal is configured with a power line switching module; the power line switching module is configured with three interfaces, one power control unit and one single-pole double throw switch; wherein, a first interface connects the power interface of the wireless access terminal; a second interface connects the power line of the external USB interface, a third interface connects the power line of the wireless data card, and a first connection end of the single-pole double throw switch connects the third interface; the method further comprises: when it is not detected that the wireless data card establishes connection with the terminal through the USB cable, the power control unit controlling a second connection end of the single-pole double throw switch to connect the first interface; and the step of the wireless access terminal switching the power line of the wireless data card to connect the power line of the wireless data card to the power line of the external USB interface on the wireless data card comprises: when it is detected that the wireless data card establishes connection with the terminal through the USB cable, the power control unit controlling the second connection end of the single-pole double throw switch to connect the second interface.

2. The method according to claim 1, further comprising: when the wireless access terminal detects that the internal wireless data card establishes connection with the terminal through the USB cable, disconnecting input of device secondary power of the wireless access terminal.

3. The method according to claim 1, wherein,
the data line switching module is a high-speed analog switch, and the power line of the high-speed analog switch connects the power line of the external USB interface and the power interface of the wireless access terminal.

4. The method according to claim 1, wherein,
the power line switching module is a relay, the power control unit is a coil within the relay, and a power input end of that coil connects the power line of the external USB interface or the power interface of the wireless access terminal.

5. The method according to claim 2, wherein,
the wireless access terminal is configured with a data line switching module; the data line switching module is configured with three ports and one switch to enable switching; wherein, a first port connects the data line of the central processing unit (CPU) within the wireless access terminal; a second port connects the data line of the wireless data card, a third port connects the data line of the external USB interface, and the switch to enable switching connects the power interface of the wireless access terminal;

the method further comprises: when there is electricity in the power interface of the wireless access terminal, the switch to enable switching conducting the first port and the second port; and the step of the wireless access terminal switching the data line of the wireless data card to connect the data line of the wireless data card to the data line of the external USB interface on the wireless data card comprises: the switch to enable switching, when there is no electricity in the power interface of the wireless access terminal, disconnecting the connection between the first port and the second port, and conducting the second port and the third port.

6. The method according to claim 2, wherein, the wireless access terminal is configured with a power line switching module; the power line switching module is configured with three interfaces, one power control unit and one single-pole double throw switch; wherein, a first interface connects the power interface of the wireless access terminal; a second interface connects the power line of the external USB interface, a third interface connects the power line of the wireless data card, and a first connection end of the single-pole double throw switch connects the third interface;

the method further comprises: when it is detected that there is electricity in the power interface of the wireless access terminal, the power control unit controlling the second connection end of the single-pole double throw switch to connect the first interface; and the step of the wireless access terminal switching the power line of the wireless data card to connect the power line of the wireless data card to the power line of the external USB interface on the wireless data card comprises: when it is detected that there is no electricity in the power interface of the wireless access terminal, the power control unit controlling the second connection end of the single-pole double throw switch to connect the second interface.

7. The method according to claim 5, wherein, the data line switching module is a high-speed analog switch, and the power line of the high-speed analog switch connects the power line of the external USB interface and the power interface of the wireless access terminal.

8. The method according to claim 6, wherein, the power line switching module is a relay, the power control unit is a coil within the relay, and a power input end of that coil connects the power line of the external USB interface or the power interface of the wireless access terminal.

9. A wireless access terminal, comprising a data line switching module and a power line switching module, wherein, the data line switching module is configured to, when it is detected that the wireless data card is connected with a terminal through a universal serial bus (USB) cable, switch a data line of the wireless data card to connect the data line of the wireless data card to a data line of an external USB interface of the wireless data card; and the power line switching module is configured to, when it is detected that the wireless data card within the wireless access terminal is connected with the terminal through the USB cable, switch a power line of the wireless data card to connect the power line of the wireless data card to a power line of the external USB interface of the wireless data card; wherein, the data line switching module is configured with three ports and one switch to enable switching; wherein, a first port connects a data line of a central processing unit (CPU) within the wireless access terminal; a second port connects the data line of the wireless data card, and a third port connects the data line of the external USB interface; and the switch to enable switching connects the power line of the external USB interface, and is configured to: when there is no electricity in the power line of the external USB interface, conduct the first port and the second port; and when there is electricity in the power line of the external USB interface, disconnect connection between the first port and the second port and conduct the second port and the third port;

or, the power line switching module is configured with three interfaces, one power control unit and one single-pole double throw switch; wherein, a first interface connects a power interface of the wireless access terminal; a second interface connects the power line of the external USB interface, the a interface connects the power line of the wireless data card, and a first connection end of the single-pole double throw switch connects the third interface; the power control unit is configured to: when it is not detected that the wireless data card establishes the connection with the terminal through the USB cable, control a second connection end of the single-pole double throw switch to connect the first interface; and when it is detected that the wireless data card establishes the connection with the terminal through the USB cable, control the second connection end of the single-pole double throw switch to connect the second interface.

10. The wireless access terminal according to claim 9, further comprising a complete machine power control module, which is configured to, when it is detected that the wireless data card establishes the connection with the terminal through the USB cable, disconnect input of device secondary power of the wireless access terminal.

11. The wireless access terminal according to claim 9, wherein, the data line switching module is a high-speed analog switch, and the power line of the high-speed analog switch connects the power line of the external USB interface and the power interface of the wireless access terminal.

12. The wireless access terminal according to claim 9, wherein, the power line switching module is a relay, the power control unit is a coil within the relay, and a power input end of that coil connects the power line of the external USB interface or the power interface of the wireless access terminal.

13. The wireless access terminal according to claim 10, wherein, the complete machine power control module comprises a self-powered unit and one metal-oxide-semiconductor field-effect transistor (MOSFET);

the self-powered unit is configured to provide a secondary voltage for the MOSFET;

a source of the MOSFET connects an output end of the self-powered unit and a secondary power enabling end of the wireless access terminal, a grid connects the power line of the external USB interface, and a drain is earthed.

14. The wireless access terminal according to claim 13, wherein, the self-powered unit is a low dropout linear regulator (LDO), input of the LDO is the output of an external power adapter of the wireless access terminal after plugging in mains power, and the LDO is configured to transform a primary voltage output by the power adapter into the secondary voltage and then input into the MOSFET.

15. The wireless access terminal according to claim 14, wherein, the data line switching module is configured with three ports and one switch to enable switching; wherein, the first port connects the data line of the central processing unit (CPU) within the wireless access terminal; the second port connects the data line of the wireless data card, and the third port connects the data line of the external USB interface; and the switch to enable switching connects the power interface of the wireless access terminal and is configured to: when there is electricity in the power interface of the wireless access terminal, conduct the first port and the second port; and when there is no electricity in the power interface of the wireless access terminal, disconnect the connection between the first port and the second port and conduct the second port and the third port.

16. The wireless access terminal according to claim 14, wherein, the power line switching module is configured with three interfaces, one power control unit and one single-pole double throw switch; wherein, the first interface connects the power interface of the wireless access terminal; the second interface connects the power line of the external USB interface, the third interface connects the power line of the wireless data card, and the first connection end of the single-pole double throw switch connects the third interface;

the power control unit is configured to: when it is detected that there is electricity in the power interface of the wireless access terminal, controlling the second connection end of the single-pole double throw switch to connect the first interface; and when it is detected that there is no electricity in the power interface of the wireless access terminal, controlling the second connection end of the single-pole double throw switch to connect the second interface.

17. The wireless access terminal according to claim 15, wherein, the data line switching module is a high-speed analog switch, and the power line of the high-speed analog switch connects the power line of the external USB interface and the power interface of the wireless access terminal.

18. The wireless access terminal according to claim 16, wherein, the power line switching module is a relay, the power control unit is a coil within the relay, and a power input end of that coil connects the power line of the external USB interface or the power interface of the wireless access terminal.

* * * * *

UNITED STATES PATENT AND TRADEMARK OFFICE
CERTIFICATE OF CORRECTION

PATENT NO. : 8,850,096 B2  
APPLICATION NO. : 13/509675  
DATED : September 30, 2014  
INVENTOR(S) : Ruijuan Zhang et al.

Page 1 of 1

It is certified that error appears in the above-identified patent and that said Letters Patent is hereby corrected as shown below:

In the Claims

Column 14, Line 23, Claim 9:

After "external USB interface"  
Delete "the a" and  
Insert -- a third --.

Signed and Sealed this  
Thirty-first Day of March, 2015

Michelle K. Lee  
*Director of the United States Patent and Trademark Office*